US010938214B2

(12) United States Patent
Majumder (10) Patent No.: US 10,938,214 B2
(45) Date of Patent: Mar. 2, 2021

(54) SELECTION OF GRID FORMING POWER GENERATORS BASED ON LOCATION IN A MICROGRID (71) Applicant: ABB Power Grids Switzerland AG, Baden (CH)

(72) Inventor: Ritwik Majumder, Västerås (SE)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 68 days.

(21) Appl. No.: 16/217,870

(22) Filed: Dec. 12, 2018

(65) Prior Publication Data
US 2019/0181645 A1   Jun. 13, 2019

(30) Foreign Application Priority Data
Dec. 12, 2017   (EP) ..................................... 17206598

(51) Int. Cl.
*H02J 3/38* (2006.01)
*G05B 19/042* (2006.01)
*H02J 13/00* (2006.01)
*H02J 3/46* (2006.01)

(52) U.S. Cl.
CPC ............ *H02J 3/381* (2013.01); *G05B 19/042* (2013.01); *H02J 3/46* (2013.01); *H02J 13/0017* (2013.01); *G05B 2219/2639* (2013.01); *H02J 3/388* (2020.01)

(58) Field of Classification Search
CPC .... H02J 3/381; H02J 3/46; H02J 3/388; H02J 13/0017; G05B 19/042; G05B 2219/2639
See application file for complete search history.

(56) References Cited

U.S. PATENT DOCUMENTS

| 9,368,973 | B2 | 6/2016 | Creed |
| 9,472,954 | B2 | 10/2016 | Piyabongkam et al. |
| 9,563,248 | B2 | 2/2017 | Darden, II et al. |
| 2007/0100503 | A1* | 5/2007 | Balan ...................... H02J 3/382 700/286 |
| 2008/0278000 | A1* | 11/2008 | Capp ......................... H02J 3/28 307/21 |

(Continued)

FOREIGN PATENT DOCUMENTS

| CN | 106099985 A | 11/2016 |
| WO | 2013049547 A2 | 4/2013 |

(Continued)

OTHER PUBLICATIONS

European Search Report Application No. 17206598.9 Completed: May 2, 2018 6 Pages.

*Primary Examiner* — Thomas C Lee
*Assistant Examiner* — Gary Collins
(74) *Attorney, Agent, or Firm* — Slater Matsil, LLP (57) ABSTRACT A method for controlling a microgrid including a plurality of assets connected in the microgrid, including loads and Distributed Generators, of which DGs at least a plurality are resources capable of being controlled in a grid forming mode for controlling the voltage and frequency in the microgrid. The method includes selecting a set of resources of the plurality of resources based on the respective location within the microgrid of each of the resources in the selected set, and activating a grid forming control mode for the resources in the selected set.

22 Claims, 4 Drawing Sheets (56) References Cited

U.S. PATENT DOCUMENTS

| | | | | |
|---|---|---|---|---|
| 2012/0101639 A1* | 4/2012 | Carralero | ................ | H04L 41/12 |
| | | | | 700/286 |
| 2012/0271470 A1* | 10/2012 | Flynn | ..................... | H02J 3/383 |
| | | | | 700/292 |
| 2013/0079943 A1* | 3/2013 | Darden, II | ............. | G06Q 30/04 |
| | | | | 700/297 |
| 2014/0229031 A1* | 8/2014 | Amarin | .................... | H02J 3/00 |
| | | | | 700/295 |
| 2016/0329713 A1* | 11/2016 | Berard | .................... | H02J 3/381 |
| 2017/0070048 A1* | 3/2017 | Paolone | .................... | H02J 3/14 |
| 2017/0176965 A1 | 6/2017 | Martin Lloret et al. | | |
| 2018/0316184 A1* | 11/2018 | Hong | .................... | G05B 15/02 |

FOREIGN PATENT DOCUMENTS

| | | | |
|---|---|---|---|
| WO | 2016004651 A1 | 1/2016 | |
| WO | 2017009735 A1 | 6/2017 | |

* cited by examiner

SELECTION OF GRID FORMING POWER GENERATORS BASED ON LOCATION IN A MICROGRID

TECHNICAL FIELD

The present disclosure relates to a method and device for grid forming control of an electrical power microgrid.

BACKGROUND

A microgrid is a localized grouping of electricity generation, energy storage, and loads that normally operates connected to a traditional centralized grid (power distribution grid or macrogrid) via a point of common coupling (PCC). This single point of common coupling with the macrogrid can be disconnected, islanding the microgrid. Microgrids are part of a structure aiming at producing electrical power locally from many small energy sources, Distributed Generators (DGs). In a microgrid, a DG is connected via a converter which controls the output of the DG, i.e. the current injected into the microgrid. Or the DG can be a synchronous machine directly connected to the microgrid.

A microgrid (in grid connected mode, i.e. connected to the distribution grid) supplies the optimized or maximum power outputs from the connected DG sites and the rest of the power is supplied by the distribution grid. The microgrid is connected to the distribution grid at a PCC through a controllable switch/breaker. This grid connection is lost when the breaker is open during grid fault and the microgrid is islanded.

A microgrid is controlled by a controller, which may be centralized or distributed, which e.g. controls DGs in accordance with voltage or current control schemes. One of the aspects of microgrid control is efficient control of the grid interface at the PCC. Various conditions e.g. power flow, voltage, disconnection or power factor at the PCC impose different control requirement within the microgrid.

There are various methods to control the grid interface and one of them is to have a dedicated network controller. The network controller can monitor and communicate different system conditions to other controllers within the microgrid (e.g. status of the grid circuit breaker). The network controller can participate in various functions such as black start, resynchronization, planned islanding, voltage droop for the microgrid as well as power factor correction. For instance, a breaker controller may communicate the breaker status (open or closed) to a microgrid network controller which then informs the DG controllers of the microgrid. Further, set-points, e.g. power o voltage set-points, may be sent from the network controller to the DG controllers, and measured output power and/or voltage may be sent from the DG controllers to the network controller. Also information about tripping of a DG may be sent from the associated DG controller to the network controller.

High penetration of renewable energy sources as DGs results in lower inertia which is typical within a microgrid. Lower inertia results in larger frequency deviation during a system disturbance and that can trip various frequency based protection systems. When islanded from distribution grid, one common practice is to use an energy storage system (ESS), e.g. a Battery ESS (BESS), as grid forming resources, i.e. for controlling the voltage and frequency within the microgrid. Grid forming implies establishing the system voltage and frequency or participate in regulating them.

It is possible to operate more than one resource in grid forming mode with simple power sharing at the outer loop feedback of the controllers. With a week grid connection, regulation of voltage and frequency from the microgrid resources can help system stability. Thus using multiple microgrid resources in grid forming mode is beneficial in a microgrid. One method is described in PCT/EP2015/079135, according to which multiple grid forming resources are used and grid formation is operated within the current limits of the resources, e.g. BESS.

U.S. Pat. No. 9,563,248 discloses locating power generators at different suitable locations within a microgrid which can be started up and connected to the microgrid when needed to provide emergency back-up power supply locally in response to power disruption or instability.

U.S. Pat. No. 9,472,954 discloses a processor arranged to operate a plurality of generators in a microgrid during transient conditions based on efficiency bands of the generators.

SUMMARY

It is an objective of the present invention to provide an improved way of selecting the different resources for grid formation within a microgrid.

According to an aspect of the present invention, there is provided a method for controlling a microgrid. The microgrid comprises a plurality of assets connected in the microgrid. The assets includes loads and DGs. At least a plurality of the DGs are resources capable of being controlled in a grid forming mode for controlling the voltage and frequency in the microgrid. The method comprises selecting a set of resources of the plurality of resources based on the respective location within the microgrid of each of the resources in the selected set. The method also comprises activating a grid forming control mode for each of the resources in the selected set, whereby they are used to control the voltage and frequency of the microgrid and wherein the selecting (25) comprises selecting said set from a plurality of different sets, each of the different sets comprising a different plurality of the resources.

According to another aspect of the present invention, there is provided a computer program product comprising computer-executable components for causing a control system to perform an embodiment of the method of the present disclosure when the computer-executable components are run on processing circuitry comprised in the control system.

According to another aspect of the present invention, there is provided a control system configured for controlling a microgrid. The microgrid comprises a plurality of assets connected in the microgrid. The assets includes loads and DGs. At least a plurality of the DGs are resources capable of being controlled in a grid forming mode for controlling the voltage and frequency in the microgrid. The control system comprises processing circuitry, and data storage storing instructions executable by said processing circuitry whereby said control system is operative to select a set of resources of the plurality of resources based on the respective location within the microgrid of each of the resources in the selected set, and activate a grid forming control mode for each of the resources in the selected set.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

A microgrid is usually, at a PCC, connected to a distribution grid which then controls the voltage and frequency of the microgrid to the same as in the distribution grid. However, if the microgrid is islanded from the distribution grid or the grid connection is weak, some of the DGs (e.g. synchronous power generators (SG) and energy storages (ESS, e.g. BESS)) in the microgrid may need to be run in grid-forming mode in which they are used to control the voltage and frequency of the microgrid. The present invention relates to how to choose which resources to use for grid-forming in a microgrid, e.g. in case of islanding or weak grid connection. The resources are grouped into different sets of potential grid-forming resources. For each set of resources, a grid-forming index (GFI) is calculated based on the power and location of the resources in the set. When a disturbance, e.g. islanding, occurs, the GFI required for stabilizing the microgrid in view of the disturbance is calculated, and the set of resources having corresponding (or higher) GFI is chosen for grid-forming.

Herein, the term "asset" is used to denote any devices comprised in the microgrid, typically connected (or connectable, if currently disconnected) to a bus of the microgrid, including e.g. loads, circuit breakers (CB), and power generators (i.e. DGs). The term "DG" (distributed generator) is used to denote any power generator comprised, and connected/connectable, in the microgrid, regardless of whether the generator is able to run in a grid forming mode or not, e.g. including renewable power generators such as photovoltaic generators (PV) or wind turbines which may not be suitable for grid forming. The term "resource" is used for denoting a DG in the microgrid which is able to run in a grid forming mode, such as an ESS (e.g. BESS or flywheel) or SG (e.g. diesel or gas generator).

Figure 1:
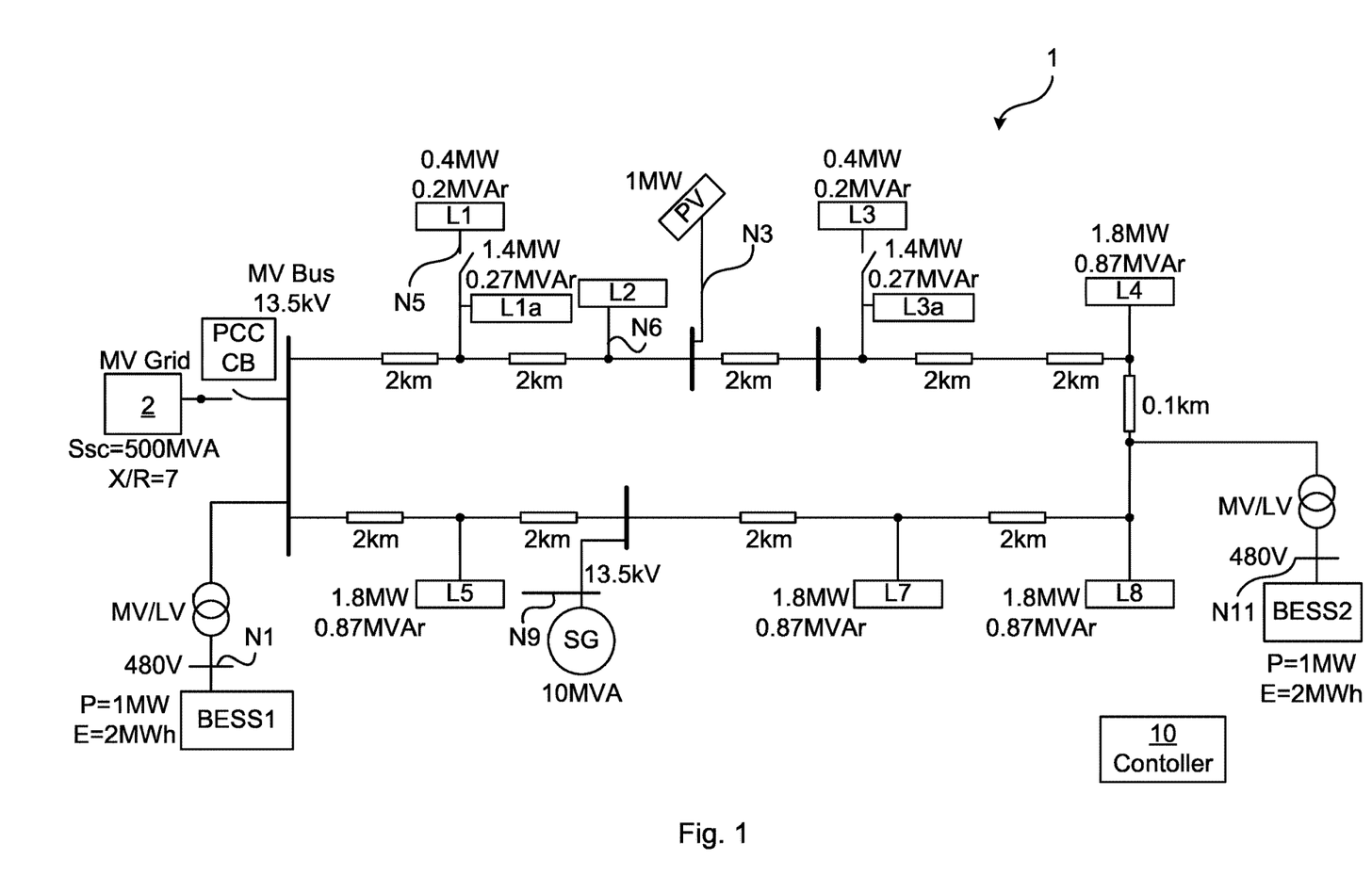
FIG. 1 is a schematic illustration of an embodiment of a microgrid, in accordance with the present invention.

FIG. 1 illustrates an embodiment of a microgrid 1 connectable to a medium voltage (MV) distribution grid 2 via a circuit breaker (CB) of the PCC. In the microgrid are connected, a plurality of loads L and a plurality of DGs, of which at least some have grid forming capability, i.e. are able to run in a grid forming mode, and thus are herein called grid forming resources (or just "resources" for short). The resources may comprise any of synchronized generator(s) (SG, e.g. a diesel generator), other power generators e.g. renewable generator(s) such as photovoltaic generator(s) (PV) and/or wind turbine(s), and ESS(s) e.g. BESS(s).

The microgrid of FIG. 1, comprises nine loads L, called loads L1, L1a, L2, L3, L3a, L4, L5, L7 and L8, one PV, one SG and two BESS, called BESS1 and BESS2. The BESS(s) are each connected via a respective MV/LV power transformer to transform the low voltage (LV), e.g. 480 V as exemplified in the figure, provided by the BESS to the MV, e.g. 13.5 kV as exemplified in the figure, of the MV bus of the microgrid.

The GFI are herein as examples calculated in relation to different nodes N within the microgrid 1, at which nodes real P and reactive Q power, usually as well as voltage, are periodically or continuously measured. Thus a first node N1 is defined as the point where the first BESS BESS1 connects in the microgrid, a third node N3 is defined as the point where the PV connects in the microgrid, a fifth node N5 is defined as the point where the first load L1 connects in the microgrid, a sixth node N6 is defined as the point where the second load L2 connects in the microgrid, a ninth node N9 is defined the SG connects in the microgrid, and an eleventh node N11 is defined where the second BESS BESS2 connects in the microgrid. Voltage and/or frequency may additionally be measured also in other locations/nodes, e.g. at PCC(s) of the microgrid.

As indicated in the figure, the different assets (loads and DGs) of the microgrid may be located some distance from each other, e.g. several kilometres, which in combination with the impacts of the different assets, implies that if the connection with the MV grid 2 is weak, it may not be able to control the frequency and voltage (typically to the same frequency and voltage as of the grid 2) throughout the whole microgrid. Rather, the frequency and/or voltage in the remote microgrid some distance away from the PCC may be determined by the assets connected therein. In such case, it may be necessary to select some of the grid forming resources for running in grid forming mode, thus foregoing some of their power production capabilities for stabilizing the frequency and/or voltage of the remote microgrid. This also implies that the power injection is not based on grid measurement and current control but rather based on voltage and frequency control.

There may also be other instabilities than a weak PCC grid connecting, e.g. islanding (PCC CB open, i.e. non-conducting) or other transient events, which may disrupt the frequency and/or voltage in some part of the microgrid 1.

The control of the microgrid 1, including the selection of resources to be used for grid forming at any point in time, is done by a control system 10 which may comprise numerous control units, e.g. including centralized control unit(s) and/or distributed control units, e.g. co-located with each asset in the microgrid. The method disclosed herein may typically be performed in/by the control system 10.

A reason for not using all grid forming resources in grid forming mode when grid forming is desired is that that would reduce the active power injection in the microgrid from the different resources and may also result in over-regulation of system voltage and frequency. It is also noted that not all DGs in the microgrid 1 may be resources able to run in grid forming mode.

In accordance with the present invention, the microgrid control system 10 selects resources/DGs to operate as grid forming units based on an obtained, e.g. calculated, GFI. The microgrid stability or GFI may be calculated with grid forming unit power rating and a weightage the resources location within the microgrid.

The GFI requirement may be calculated based on the location of the loads L connected in the microgrid, and (optionally) on grid parallel DGs/resources, i.e. DGs with or without grid forming capability which inject real and reactive power with a current control approach and thus do not participate in voltage and frequency control (are not running in a grid forming mode). With any change in load or power output within the microgrid 1, the control system 10 may re-calculate the GFI requirement. This improves the stability of the microgrid since the change in control mode (to grid forming mode, e.g. from power control mode) is not necessarily based on measured deviations in voltage and frequency. A set of resources is selected for running in grid forming mode based on a location based GFI calculated for that set. Which resources to use for grid forming may e.g. depend on loads L, strength of the connection with the grid 2 at the PCC, available power from the resources and the control system 10.

Referring to FIG. 1, in an example embodiment after islanding (i.e. PCC CB is open), the first load L1, the third load L3, the fourth load L4 and the seventh load L7 are disconnected by means of respective CBs (so called load shedding). The control system 10 may then select the SG and BESS2 resources for stabilizing the microgrid in grid forming mode. Meanwhile, the other resources BESS1 and PV may continue to operate in another mode, e.g. power control or droop control mode.

In some embodiments, the microgrid 1 may be a nested microgrid which may comprise a plurality of interconnected sub-microgrids, e.g. a first sub-microgrid and a second sub-microgrid, each of which may comprise a PCC with a (same or different) distribution grid. Then, for instance if the first sub-microgrid is islanded at its PCC, loads in the first sub-microgrid may be disconnected and resources in the first and/or in the second sub-microgrid may be selected to run in grid forming mode to stabilize the first sub-microgrid.

Figure 2:
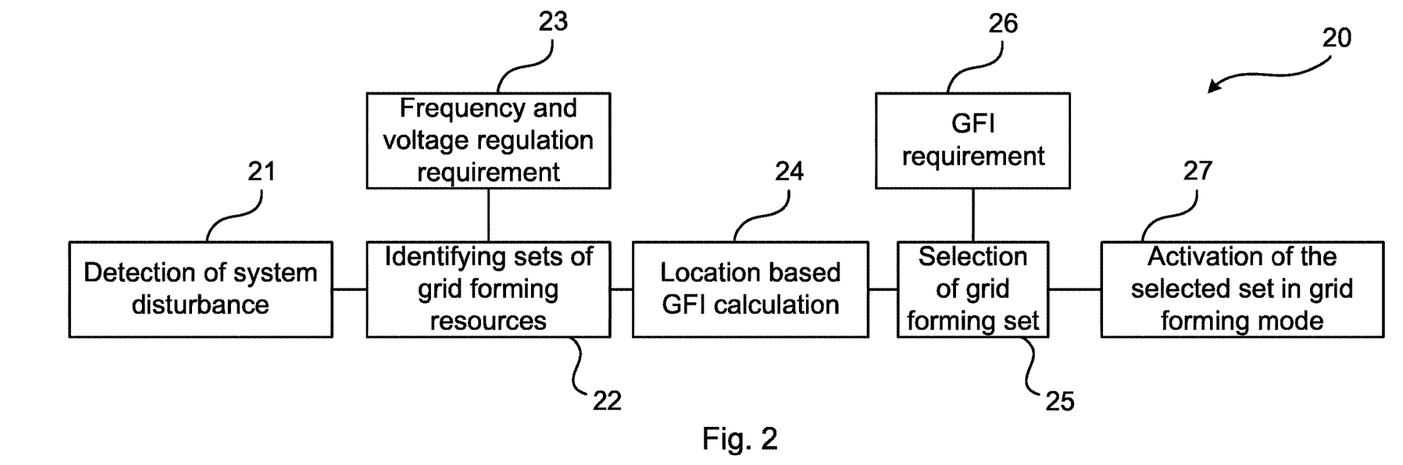
FIG. 2 is a schematic flow chart of an embodiment of the method of the present invention, with dynamic identification of potential grid forming sets of resources.
Figure 3:
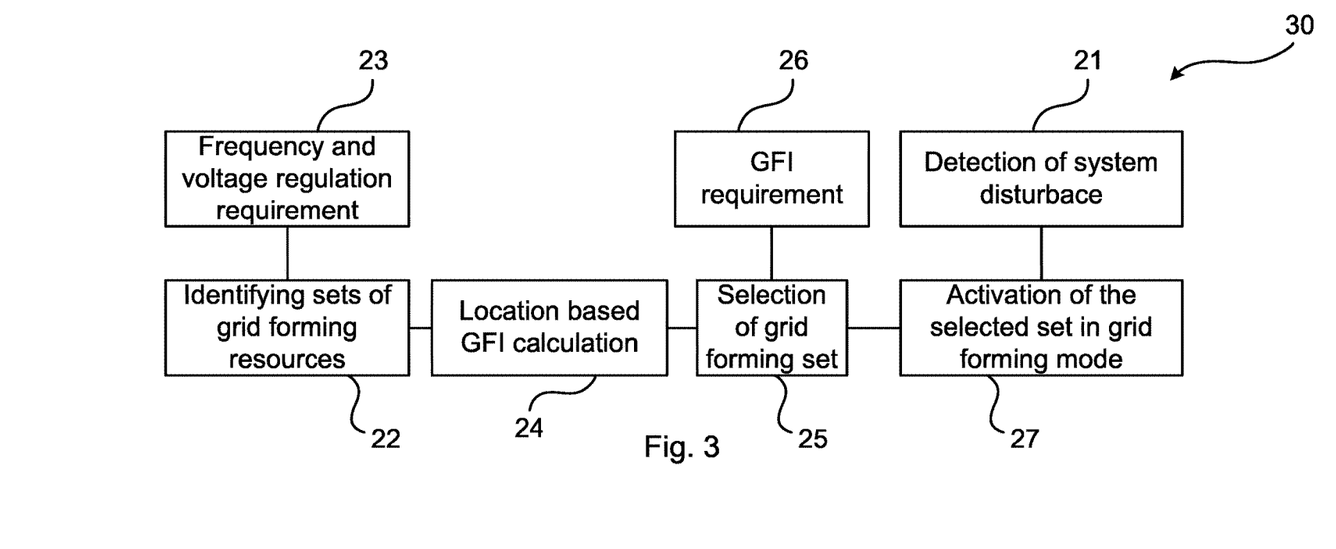
FIG. 3 is a schematic flow chart of another embodiment of the method of the present invention, with pre-identified potential grid forming sets of resources.

FIGS. 2 and 3 illustrates different example embodiments 20 and 30 of a method for selecting a set of grid forming resources which may be performed in/by the control system 10.

Method embodiment 20 of FIG. 2 relates to selecting the resources, e.g. dynamically, after a disturbance, e.g. resulting from islanding, a weak grid connection, tripping of an asset or other transient event, is detected. The disturbance is detected 21 by the control system 10, inducing the control system 10 to identify 22 sets of resources which potentially can be used for grid forming in view of an obtained 23 frequency and voltage regulation requirements. Then, the respective location based GFI is calculated 24 for each set. One of the grid forming sets is selected 25 by comparing the respective calculated GFI of the identified sets with an obtained 26 GFI requirement. Then, grid forming mode is activated 27 in the resources of the selected set. In this case, the calculating 26 of the GFI requirement is done before the calculating 24 of the GFI for each set. The calculating 24 of the GFI for each set may thus be done in response to the detected 21 disturbance, e.g. islanding or weak grid connection.

Method embodiment 30 of FIG. 3 differs from the method embodiment 20 in that a grid forming set is pre-selected 25 for a disturbance, e.g. islanding, which means that when that disturbance is detected 21, the grid forming mode may more rapidly be activated in the pre-selected set of resources. The calculating 24 of the GFI for each set may thus be done before the calculating 26 of the GFI requirement. The GFI for each set may be recalculated periodically, or in response to an event, based on the present power injections in the microgrid.

The voltage and frequency regulation requirements obtained 23 are the predefined ranges within which the voltage and frequency, respectively, should be in the microgrid bus. For instance, the voltage regulation requirement of the microgrid 1 may be that the voltage should be within the range of +/−10% of the nominal voltage of the nominal voltage of the microgrid, e.g. 13.5 kV as in FIG. 1. Similarly, for a microgrid having the nominal voltage of 400 V, the voltage regulation requirement may e.g. be that the voltage in the microgrid (typically the bus of the microgrid) should be within the range of 360-440 V.

In contrast, the obtained 26 GFI requirement describes the need for voltage and frequency controlling ability for stabilizing the microgrid, which includes the loads L and other assets, e.g. DGs which are not on grid forming mode, connected in the microgrid, in order to enable meeting the above mentioned voltage and frequency regulation requirement. This may be calculated with the microgrid network equations of the assets (loads and DGs). In order to obtain a number for the GFI requirement, for the need of grid forming control, an equation may be formed based on the impact of power injected by all DGs in the microgrid on frequency and voltage in the microgrid bus. Thus, during calculation of the GFI requirement, the total GFI needed for the microgrid is calculated and that is done by considering the network equations including the loads and DGs, both those in grid forming mode and those in any non-grid forming mode since all the power injected in the microgrid is considered. That is a difference between calculating GFI requirement and calculating GFI of each set of resources. GFI requirement is the requirement of grid formation as an index from all the connected loads and DGs (including resources able to run in grid forming mode, as well as other DGs). GFI of resource sets are calculates based on the different alternative sets of grid forming resources are possible in the microgrid. For instance, the PV is herein a DG which cannot be run in grid forming mode. Thus, the PV is included in the calculation of the GFI requirement (see eq. 7, below) but not included when calculating the GFI of resource sets (see eq. 1-3, below). The GFI requirement means the need of voltage and frequency controlling ability for the microgrid with the loads and other assets connected in the microgrid.

Figure 4:
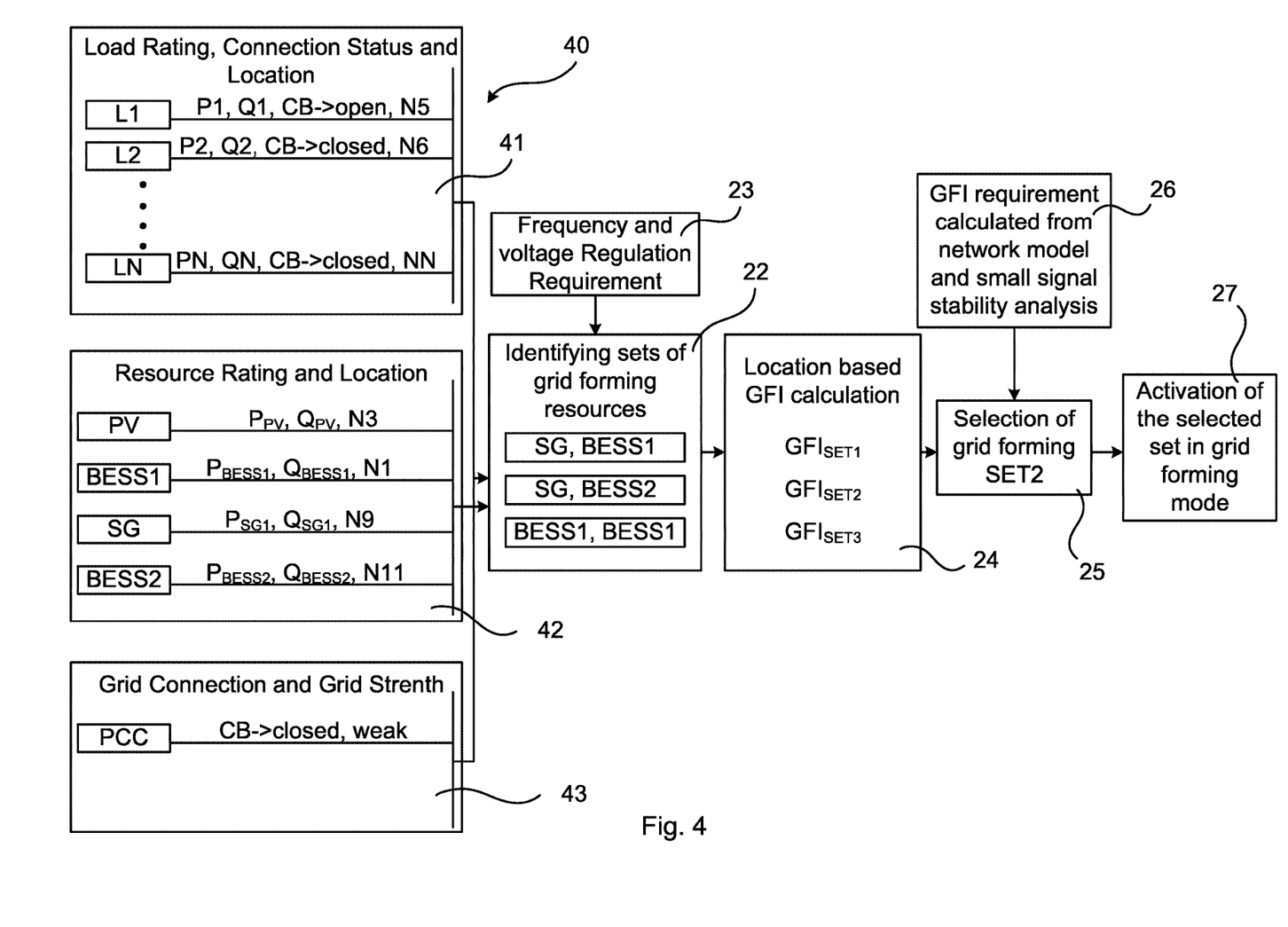
FIG. 4 is a schematic flow chart of an example embodiment of the method of the present invention in more detail and with input information.

The selection 25 of grid forming resources is shown with more details in FIG. 4. Input 40 of asset information to the control system 10 is shown as an example. Load information 41 may comprise the load rating (P and Q power), connection status (local CB is closed or open, connecting or disconnecting the load to the bus of the microgrid 1) and location (which node N is the load connected at) and is received by the control system 10. Corresponding information 42 for the resources (DGs able to run in grid forming mode), such as resource rating (P and Q power), connection status (local CB is closed or open, connecting or disconnecting the resource to the bus of the microgrid 1) and location (which node N is the resource connected at) is also received by the control system 10. Grid connection information 43 at the PCC (PCC CB is closed or open, connecting or disconnecting the microgrid to the distribution grid 2, and is the grid connection strong or weak if the PCC CB is in its closed position) may also be received and taken into consideration by the control system 10. A signal stability analysis equation of the microgrid at each node N, e.g. at resources and loads connected throughout the microgrid may indicate the sensitivity of microgrid frequency and voltage with active and reactive power injection. Higher participation with the dominant mode indicates a more suitable resource for grid forming.

When the GFI for a set of resources is calculated, the GFI indicates how the resources of the set, if run in grid forming mode, is able to influence the voltage and/or frequency stability of the microgrid bus within the predetermined regulation requirements, accounting for the oscillations in voltage and frequency control. This may be done based on participation of the grid forming resources on frequency and voltage regulation. To obtain a number for the GFI, a weightage is used in combination with the respective ratings of the resources in the set.

Thus, the GFI requirement is calculated from the electrical circuit parameters and network equations of the microgrid, while the GFI of a set of resources is calculated based on the impact of control. In both cases the reference quantities are voltage and frequency.

As an example, the GFI for each set of grid forming resources may be calculated as shown in equation 1-3, where the weightages depend on the location of the resources within the microgrid and may be calculated as shown in equation 4-6. In this example, three sets of resources are identified 22, the SG in combination with the BESS1 as SET1, the SG in combination with the BESS2 as SET2, and the BESS1 in combination with the BESS2 as SET3.

$$GFI_{SET1} = \Sigma P_{SG1} * \text{Weightage}_{N9}, P_{BESS1} * \text{Weightage}_{N1} \Sigma Q_{SG1} * \text{Weightage}_{N9}, Q_{BESS1} * \text{Weightage}_{N1} \quad (1)$$

$$GFI_{SET2} = \Sigma P_{SG1} * \text{Weightage}_{N9}, P_{BESS2} * \text{Weightage}_{N11} \Sigma Q_{SG1} * \text{Weightage}_{N9}, Q_{BESS2} * \text{Weightage}_{N11} \quad (2)$$

$$GFI_{SET3} = \Sigma P_{BESS1} * \text{Weightage}_{N1}, P_{BESS2} * \text{Weightage}_{N11} \Sigma Q_{BESS1} * \text{Weightage}_{N1}, Q_{BESS2} * \text{Weightage}_{N11} \quad (1)$$

Thus, the GFI for each set of resources is based on the respective real P and reactive Q power output capability of each of its resources multiplied with a weightage for the node N where the resource is connected in the microgrid (i.e. the location of the resource in the microgrid). For example, the first BESS BESS1 is connected at the first node N1. The P and Q output capabilities of BESS1 are thus each multiplied with the weightage for node N1.

In some embodiments of the present invention, the calculating 24 of a GFI for each set comprises calculating a real power sum of the real power P rating of each resource in the set times its respective weightage, and a reactive power sum of the reactive power Q rating of each resource in the set times said respective weightage. The ratings relate to the potential power injections of the respective resources in the set, and should be the same or higher than what is required as stated by the GFI requirement.

The weightage for each grid forming resource based on location may be calculated based on state of art methods like participation or sensitivity of the states on the different modes of oscillation related to voltage and frequency. Herein it is more related to control of frequency with active power and voltage with reactive power. An example of the calculation of the weightages for the first node N1, the ninth node N9 and the eleventh node N11 is shown by equations 4-6.

$$\text{Weightage}_{N1} = [p\{\lambda_{mode1}, P_{N1}\} * K1, p\{\lambda_{mode2}, Q_{N1}\} * K2] \quad (4)$$

$$\text{Weightage}_{N11} = [p\{\lambda_{mode1}, P_{N11}\} * K1, p\{\lambda_{mode2}, Q_{N11}\} * K2] \quad (5)$$

$$\text{Weightage}_{N9} = [p\{\lambda_{mode1}, P_{N9}\} * K1, p\{\lambda_{mode2}, Q_{N9}\} * K2] \quad (6)$$

Where, K1 and K2 are constants, and p indicates participation of active and reactive power injection of the respective resource to the dominant mode $\lambda_{mode1}$ and $\lambda_{mode2}$, respectively.

The GFI requirement may be calculated 26 from the network equation of the microgrid 1, loads L and resource locations (nodes N). Once the requirement on voltage V and frequency F regulation bandwidths are defined by an operator of the microgrid, the voltage and frequency references are set. Thus, once it is decided by the operator that the regulation requirement for the microgrid is e.g. +/−10% for voltage, the voltage references are selected for the grid forming control of the resources running in grid forming control of the resources running in grid forming mode, to keep the microgrid voltage with the regulation limit.

$$GFI_{ReqPF} = \sum P_{PVN3} * \text{Impact}_{N3}, \; P_{BESS1} * \text{Impact}_{N1} \\ P_{BESS2} * \text{Impact}_{N11} \quad P_{SG2} * \text{Impact}_{N11}$$

$$GFI_{ReqQV} = \sum Q_{PVN3} * \text{Impact}_{N3}, \; Q_{BESS1} * \text{Impact}_{N1} \\ Q_{BESS2} * \text{Impact}_{N11} \quad Q_{SG2} * \text{Impact}_{N11}$$

where $$\text{Impact}_{N1} = [p\{fP_{BESS1}\} * Ka, p\{V_{BESS1}Q_{BESS1}\} * Kb] \quad (8)$$

$$\text{Impact}_{N3} = [p\{fP_{PV}\} * Ka, p\{V_{PV}Q_{PV}\} * Kb] \quad (9)$$

$$\text{Impact}_{N9} = [p\{fP_{BESS2}\} * Ka, p\{V_{BESS2}Q_{BESS2}\} * Kb] \quad (10)$$

$$\text{Impact}_{N11} = [p\{fP_{SG1}\} * Ka, p\{V_{SG1}Q_{SG1}\} * Kb] \quad (11)$$

PF is used in subscript of $GFI_{reqPF}$ to indicate that this is the GFI requirement for power frequency control. Similarly $GFI_{reqQV}$ is for reactive power voltage control GFI requirement. PV represents the PV resource. Typically, all the power injection P and Q by all the DGs (also not grid forming) are considered to calculate the GFI requirement, which is then satisfied by the selection of a suitable set of resources for grid forming. p is the participation factor, indicating how the power injection from a resource, e.g. BESS, can impact the control of frequency f or voltage V. Ka and Kb are constants used to define the impact.

Thus, in some embodiments of the present invention, the calculating 26 of the GFI requirement comprises calculating a real power sum of the real power P injections of each DG times a respective impact value associated with the DG, and a reactive power sum of the reactive power Q injections of each DG times the respective impact value associated with the DG.

Figure 5:
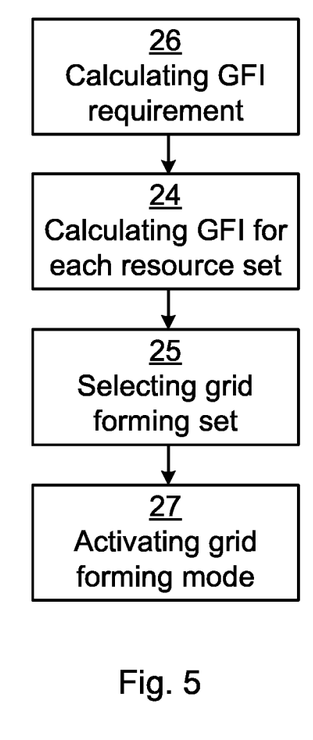
FIG. 5 is a schematic flow chart of a more general embodiment of the method of the present invention.

FIG. 5 is a flow chart more generally illustrating embodiments of the method of the present invention. The method is for controlling a microgrid 1. The microgrid comprises a plurality assets connected in the microgrid. The assets include loads L and Distributed Generators (DG), e.g. BESS, flywheel or other energy storage system, SG e.g. diesel, PV, wind turbine or other renewable power generator. At least some of the DGs are resources, e.g. BESS or other ESS, or SG, capable of being controlled in a grid forming mode for controlling the voltage and frequency in the microgrid, i.e. using a voltage and/or frequency reference.

The method comprises calculating, or otherwise obtaining e.g. from a data storage in the control system 10, 26 a GFI requirement $GFI_{req}$ based on real P and reactive Q power injections of each of the DGs in the microgrid and on the impact of said injections on voltage and frequency control in the microgrid.

Before, after or concurrent with the calculating 26 of the GFI requirement, the method also comprises calculating (24) a GFI for each set of a plurality of sets of the resources. Each set of resources comprises at least one, preferably a plurality of, the resources in the microgrid. The GFI for each set is based on respective real and reactive power ratings of each of the resources in the set, as well as on respective location weightages, wherein the respective location weightage of each of the resources in the set is dependent on the location of the resource within the microgrid.

Then, one of the sets is selected 25 to be used for controlling the voltage and frequency in the microgrid, based on the calculated 24 GFI of said set compared with the calculated 26 GFI requirement. Typically, the GFI of the selected set should fulfil or exceed the GFI requirement.

Then, the grid forming control mode is activated 27 for each of the resources in the selected 25 set. This typically implies that the control mode of the resources is changed, e.g. from power control in which the resources are controlled based on power or current reference, to the grid forming control mode, which may also be called a voltage control mode, in which the resources are controlled based on a voltage and/or a frequency reference.

In an even more general embodiment, the present invention relates to a method for controlling a microgrid 1 comprising a plurality of assets connected in the microgrid, including loads L and DGs, of which DGs, e.g. any of BESS, SG, PV etc., at least a plurality are resources, e.g. BESS, SG etc., capable of being controlled in a grid forming mode for controlling the voltage and frequency in the microgrid, wherein the method comprises selecting 25 a set of resources of the plurality of resources based on the respective location within the microgrid of each of the resources in the selected set; and activating 27 a grid forming control mode for the resources in the selected 25 set.

Figure 6:
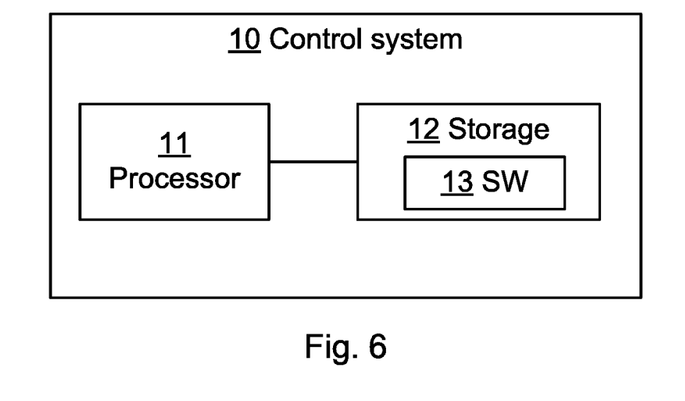
FIG. 6 is a schematic block diagram of an embodiment of a control system, in accordance with the present invention.

FIG. 6 schematically illustrates an embodiment of the control system 10 of the present disclosure. The control system 10 comprises processing circuitry 11 e.g. a central processing unit (CPU). The processing circuitry 11 may comprise one or a plurality of processing units in the form of microprocessor(s). However, other suitable devices with computing capabilities could be comprised in the processing circuitry 11, e.g. an application specific integrated circuit (ASIC), a field programmable gate array (FPGA) or a complex programmable logic device (CPLD). The processing circuitry 11 is configured to run one or several computer program(s) or software (SW) 13 stored in a data storage 12 of one or several storage unit(s) e.g. a memory. The storage unit is regarded as a computer readable means as discussed herein and may e.g. be in the form of a Random Access Memory (RAM), a Flash memory or other solid state memory, or a hard disk, or be a combination thereof. The processing circuitry 11 may also be configured to store data in the storage 12, as needed.

For instance, the SW 13 stored in the data storage 12 may, when run on the processing circuitry 11, configure the control system 10 to perform an embodiment of the method of the present disclosure.

Embodiments of the method of the present invention may thus be performed by a control system 10 of the microgrid 1, which control system comprises processing circuitry 11 associated with data storage 12. Embodiments of the present invention may be conveniently implemented using one or more conventional general purpose or specialized digital computer, computing device, machine, or microprocessor in the control system 10, including one or more processors 11, memory 12 and/or other computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product 12 which is a non-transitory storage medium or computer readable medium (media) having instructions 13 stored thereon/in, in the form of computer-executable components or software (SW) 13, which can be used to program a computer to perform any embodiment of the method of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for controlling a microgrid comprising a plurality of assets connected in the microgrid, the assets including loads and distributed generators (DGs), wherein at least some of the DGs are resources capable of being controlled in a grid forming mode for controlling a voltage and frequency in the microgrid, the resources being arranged in a plurality of different sets, the method comprising:
for each of the different sets, calculating a grid-forming index (GFI) based on respective powers and locations of the resources in the set;
calculating a required GFI for stabilizing the microgrid in view of a disturbance;
selecting a set of resources of the plurality of different sets of resources based on the respective location within the microgrid of each of the resources in the selected set, wherein the set that is selected has a GFI corresponding to the required GFI, or higher; and
activating a grid forming control mode for the resources in the selected set.

2. The method of claim 1, wherein the calculating of the required GFI is done before the calculating of the GFI for each set.

3. The method of claim 1, wherein the calculating of the GFI for each set is done before the calculating of the required GFI.

4. The method of claim 3, wherein the calculating of the GFI for each set is done periodically.

5. The method of claim 1, wherein calculating the required GFI comprises calculating a real power sum of real power injections of each DG times a respective impact value associated with the DG, and calculating a reactive power sum of reactive power injections of each DG times the respective impact value associated with the DG.

6. The method of claim 5, wherein calculating the GFI for each set comprises calculating a real power sum of a real power rating of each resource in the set times a respective weightage, and calculating a reactive power sum of a reactive power rating of each resource in the set times the respective weightage.

7. The method of claim 1, wherein calculating the GFI for each set comprises calculating a real power sum of a real power rating of each resource in the set times a respective weightage, and calculating a reactive power sum of a reactive power rating of each resource in the set times the respective weightage.

8. The method of claim 1, further comprising using the resources in the selected set to control the voltage and frequency of the microgrid.

9. The method of claim 1, wherein the calculating of the GFI for each set is done periodically.

10. A computer program product including computer-executable components for causing a control system to perform a method when the computer-executable components are run on processing circuitry included in the control system, the method comprising:
for each of a plurality of different sets of distributed generator DG resources capable of being controlled in a grid forming mode for controlling a voltage and frequency in a microgrid that includes loads and the DG resources, calculating a grid-forming index (GFI) based on respective powers and locations of the resources in the set;
calculating a required GFI for stabilizing the microgrid in view of a disturbance;
selecting a set of resources of the plurality of different sets of resources based on the respective location within the microgrid of each of the resources in the selected set, wherein the set that is selected has a GFI corresponding to the required GFI, or higher; and
activating a grid forming control mode for the resources in the selected set; and
causing the resources in the selected set to control the voltage and frequency of the microgrid.

11. The computer program product of claim 10, wherein the calculating of the required GFI is done before the calculating of the GFI for each set.

12. The computer program product of claim 10, wherein the calculating of the GFI for each set is done before the calculating of the required GFI.

13. The computer program product of claim 10, wherein the calculating of the GFI for each set is done periodically.

14. The computer program product of claim 10, wherein calculating the required GFI comprises calculating a real power sum of real power injections of each DG times a respective impact value associated with the DG, and calculating a reactive power sum of reactive power injections of each DG times the respective impact value associated with the DG.

15. The computer program product of claim 10, wherein calculating the GFI for each set comprises calculating a real power sum of a real power rating of each resource in the set times a respective weightage, and calculating a reactive power sum of a reactive power rating of each resource in the set times the respective weightage.

16. A control system for controlling a microgrid comprising a plurality of assets connected in the microgrid, the assets including loads and distributed generators (DGs), wherein at least some of the DGs are resources capable of being controlled in a grid forming mode for controlling a voltage and frequency in the microgrid, the resources being arranged in a plurality of different sets, the control system including:
processing circuitry; and
data storage storing instructions executable by said processing circuitry whereby the control system is operative to:
calculate a grid-forming index (GFI) for each of the different sets, the GFI being calculated based on respective powers and locations of the resources in the set;
calculate a required GFI for stabilizing the microgrid in view of a disturbance;
select set of resources of the plurality of different sets of resources based on the respective location within the microgrid of each of the resources in the selected set, wherein the set that is selected has a GFI corresponding to the required GFI, or higher; and
activate a grid forming control mode for the resources in the selected set.

17. The control system of claim 16, wherein the control system is configured to cause the resources in the selected set to control the voltage and frequency of the microgrid.

18. The control system of claim 16, wherein the control system is configured to calculate the required GFI before calculating the GFI for each set.

19. The control system of claim 16, wherein the control system is configured to calculate the GFI for each set before calculating the required GFI.

20. The control system of claim 16, wherein the control system is configured to calculate the GFI for each set periodically.

21. The control system of claim 16, wherein the control system is configured to calculate the required GFI by calculating a real power sum of real power injections of each DG times a respective impact value associated with the DG, and calculating a reactive power sum of reactive power injections of each DG times the respective impact value associated with the DG.

22. The control system of claim 16, wherein the control system is configured to calculate the GFI for each set by calculating a real power sum of a real power rating of each resource in the set times a respective weightage, and calculating a reactive power sum of a reactive power rating of each resource in the set times the respective weightage.

* * * * *